UNITED STATES PATENT OFFICE.

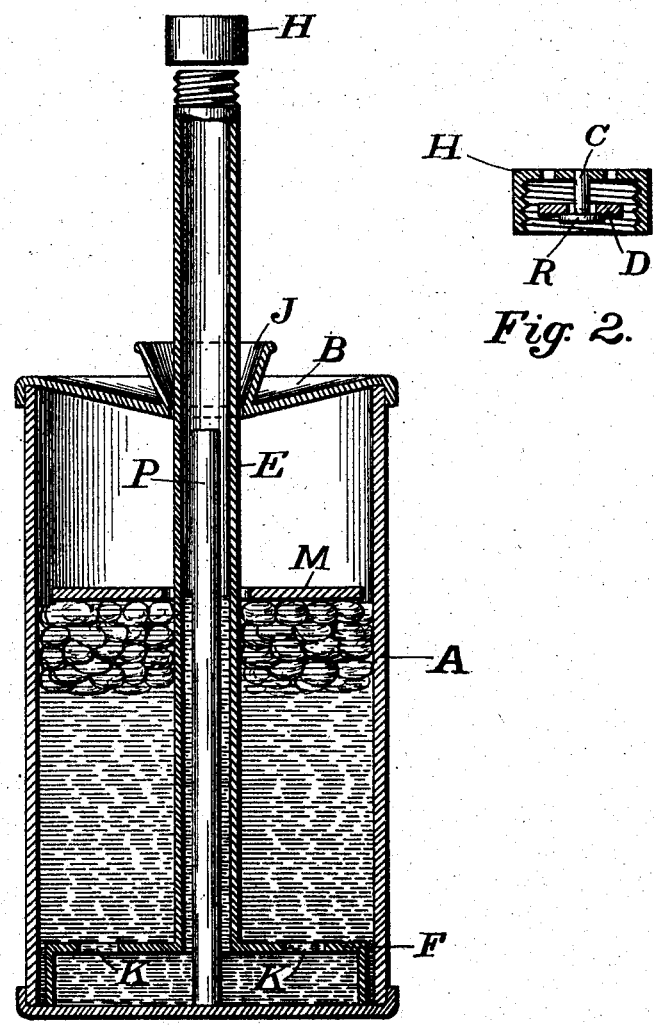

JAMES M. O'NEALL, OF DALLAS, TEXAS.

AERATING-CHURN.

No. 796,083.      Specification of Letters Patent.      Patented Aug. 1, 1905.

Application filed December 9, 1903. Serial No. 184,411.

*To all whom it may concern:*

Be it known that I, JAMES M. O'NEALL, a citizen of the United States, residing at Dallas, Texas, have invented certain new and useful Improvements in Aerating-Churns, of which the following is a specification.

This invention relates to churns, and more particularly to that class of churns adapted to aerate the milk during the churning operation until the milk is all converted into butter and the butter is free from water or milk and is of a firm consistency, and the object is to simplify the construction of churns and at the same time to produce a more cleanly and economical churn.

The churns heretofore constructed with pumps for forcing air into the milk and check-valves for preventing the liquid from entering the pump provide many places for the accumulation of grease and other matter, which will become stale and uncleanly, and these parts are difficult to cleanse thoroughly. I have remedied these defects by constructing a churn in which a separate pump with its plunger and other attachments are dispensed with and a superior method of forcing air into the milk and butter during operation is provided and in which the check-valve is out of reach of the milk and a stationary plunger prevents the butter from going up the dasher-handle, which serves as a pump-barrel and serves also to aid in forcing the air into the butter and milk.

Other objects and advantages will be fully explained in the following description, and the invention will be more particularly pointed out in the claim.

Reference is had to the accompanying drawings, which form a part of this application and specification.

Figure 1 is a vertical section of the churn and dasher and dasher-handle, except the upper portion of the handle, the latter being threaded and the screw-cap raised to show the threaded portion of the dasher-handle. Fig. 2 is a vertical section of the screw-cap, showing the arrangement of the valve.

Similar characters of reference are used to indicate the same parts throughout both the views.

This invention consists of a vessel or jar A, preferably cylindrical in form, a cover B, a dasher consisting of the agitator F and handle E, a plunger P, and valved screw-cap H. The agitator F is cup-shaped and inverted and has perforations K, so that milk, air, and butter will pass freely therethrough. The cover B is perforated for the passage of the dasher-handle and has a flared collar or guard J, which performs two functions. Warm water may be placed on top of the cover B to keep the churn at a suitable temperature, and the guard J will prevent the water from going into the churn. If any milk should rise up out of the churn with the dasher-handle, the milk will be caught inside of the guard J and will go back into the churn.

The screw-cap H carries a valve D, which is held in place by the bolt or stem C. The stem C is rigid with the cap H and has a flat head R to prevent the displacement of the valve. The cap H is perforated for the passage of air into the dasher-handle. When the dasher is being forced down, the valve D seats against the top of the screw-cap H and closes the perforations, so that the air must escape through the bottom of the dasher-handle and pass through the milk or butter and up through the perforations K in the agitator. When the dasher is being raised, the valve D will fall on the head R and allow air to come in through the perforations in the cap. The plunger P will aid in expelling the air from the dasher-handle and will prevent the butter from passing up the dasher-handle. The plunger may simply rest on the bottom, where it will be held by gravity.

The plunger P coöperates with the dasher to force the air into the milk, because the volume of the plunger fills a greater part of the space within the tubular handle E when the handle is forced down. This causes the air to be forced down under the agitator K. The air will then escape upward through the perforations in the agitator K. The current of air escaping from the bottom of the handle E will prevent butter from going up inside of the handle E. The plunger P being movable, there will be no friction between the plunger and the handle. The plunger also serves as a convenient instrument for cleaning the dasher-handle.

A float M is provided for holding the butter down. This float is perforated through the central part, so that the float will receive the dasher-handle, and the perforation is made large enough for the dasher-handle to pass freely therein as the dasher is moved up and down.

As a result of the mechanical functions performed by the valve herein described an increased amount of oxygen is taken up by the butter in the process of converting milk into butter.

Having fully described my invention, what I claim as new, and desire to secure by Letters Patent, is—

A churn comprising a suitable vessel or jar, a perforated top provided with a funnel-shaped guide to prevent waste of milk, a dasher consisting of an inverted perforated cup-shaped agitator provided with a tubular handle, an air-valve located in the upper part of said handle, a plunger mounted in said handle and resting and being easily movable on the bottom of said vessel and coöperating with said valve to force air into the milk and butter and preventing butter from rising up in said handle, and a float penetrated by said handle and coöperating to collect the butter in a mass and to prevent the same from displacing said top.

In testimony whereof I set my hand, in the presence of two witnesses, this 22d day of September, 1903.

J. M. O'NEALL.

Witnesses:
A. L. JACKSON,
J. W. STITT.